US007347234B2

(12) United States Patent
Hyysti

(10) Patent No.: US 7,347,234 B2
(45) Date of Patent: Mar. 25, 2008

(54) METHOD FOR OPTIMIZING VENEER PEELING

(75) Inventor: Mika Hyysti, Lahti (FI)

(73) Assignee: Raute Oyj (FI)

( * ) Notice: Subject to any disclaimer, the term of this patent is extended or adjusted under 35 U.S.C. 154(b) by 0 days.

(21) Appl. No.: 11/387,693

(22) Filed: Mar. 24, 2006

(65) Prior Publication Data

US 2006/0191598 A1 Aug. 31, 2006

Related U.S. Application Data

(63) Continuation of application No. PCT/FI2004/050136, filed on Sep. 23, 2004.

(30) Foreign Application Priority Data

Sep. 26, 2003 (FI) ................................. 20031390

(51) Int. Cl.
*B27D 1/04* (2006.01)
*B23Q 16/00* (2006.01)

(52) U.S. Cl. ...................... 144/332; 144/357; 144/362; 144/404; 700/52; 700/167; 703/2

(58) Field of Classification Search .. 144/209.1–215.2, 144/332, 356, 357, 362, 382, 392, 394, 402–404, 144/165, 166; 700/8, 29–32, 52, 54, 397, 700/108–110, 114, 160, 163, 173, 174, 180, 700/182, 187, 192, 193, 195; 703/2, 6, 7; 82/903

See application file for complete search history.

(56) References Cited

U.S. PATENT DOCUMENTS 3,852,579 A 12/1974 Sohn et al.
4,197,888 A * 4/1980 McGee et al. .............. 144/357
4,335,763 A 6/1982 McGee
4,397,343 A 8/1983 Fields
4,672,552 A 6/1987 Ely
5,518,052 A * 5/1996 Westberg et al. ........... 144/398
6,116,306 A 9/2000 Ely

OTHER PUBLICATIONS

International Search Report No. PCT/FI2004/050136 dated Jan. 26, 2005, 3 pages.

* cited by examiner

*Primary Examiner*—Shelley M. Self
(74) *Attorney, Agent, or Firm*—Connolly Bove Lodge & Hutz LLP

(57) ABSTRACT

The invention concerns a method for optimizing the veneer yield in veneer peeling. The contour of the log to be peeled is determined and the peeling axes at the ends of the log are determined by simulating the veneer yield. The desired veneer yield is determined at least as two veneer products having their own grades. These desired veneer products serve as basic values for the optimizing calculation. The maximum grade of the veneer yield is calculated, based on the dimensions and grades of the veneer products, as well as by iterating the places of the peeling axes and simulating the peeling process. When the peeling axes of the log ends giving the maximum grade yield have been found, the log is placed according to these peeling axes in the lathe and peeled into a veneer web to be cut with a clipper into said desired veneer products.

7 Claims, 1 Drawing Sheet

METHOD FOR OPTIMIZING VENEER PEELING

BACKGROUND

The present invention concerns a method, by means of which peeling of veneer can be performed providing an optimal veneer yield.

It is known in the art to pursue to optimize the cutting of veneer from a log by determining fixing points where the spindles are to be attached at the ends of the log to be peeled, so as to get a desired veneer yield in peeling. The fixing points of the spindles are determined by a log centring device on the upstream of the lathe, where the contour of the log and the fixing points of the spindles are determined based on the received data, so that a straight cylinder having a diameter as big as possible can be found in the log.

Based on this determination, it is also known to perform a computerized virtual peeling of the log, the result thereof being visualized on the display of a computer. The displayed result will show, first of all, the course of the initial stage, the round-up stage, what kind of random veneer will be formed in this stage and how long this stage lasts, and how much full veneer to be cut into full sheets will be received.

SUMMARY

In accordance with the present invention, it has been realized that the quality grade sectioning of the veneer web and the areas of the random veneer found out by means of the virtual veneer peeling can be changed by affecting the centering adjustments of the log. Thereby, the proportions of different veneer pieces received from the veneer web are changed, and by taking into account the grades given to different veneers, the peeling result can be optimized o maximum grade yield.

DETAILED DESCRIPTION

Figure 1:
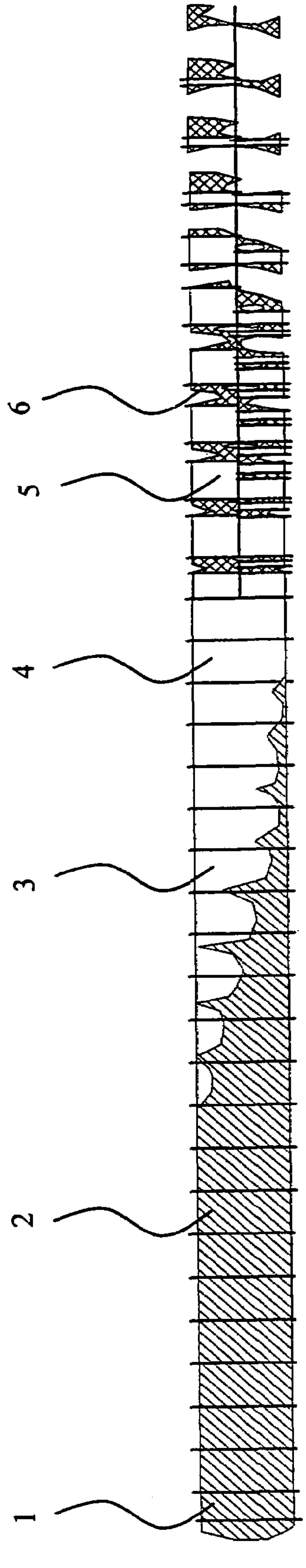
FIG. 1 shows a virtual veneer peeling as a resultant sheet cutting.

A substantial novelty compared with the optimizing methods of prior art is, that the sizes of usable veneer pieces and their grades serve as basic value for the optimization calculation.

The grade can be understood as quality classification of the veneer and thereby also as the financial value of the veneer. When implementing the invention, the basis is regarded to be giving a grade to at least two veneer quality sections, in other words at least for the random veneer (joint sheet) and the full veneer.

Further, it is possible to evaluate the quality sectioning of the full veneer to be received by peeling based on the information on the wood species. The veneer peeled from the sapwood has in cases of many wood species a better quality and more value than the veneer received from the heartwood. Also wood species with reverse quality distribution are peeled into veneer. These kinds of results are received from certain softwood species.

When implementing the invention, the contour of the log to be peeled is scanned with a method known in the art, in a centring device. In the centring device the log is rotated and the distance of its surface from the measuring line is determined at several points of the length of the log. The measuring devices as such are known in the art and in general use, like laser distance sensors. The measuring data is input to a data processing device, that is, in practice to the computer, which determines the optimal spinning axis for peeling the log. Based on this data, the qualitative veneer yield from the log will be processed by the computer. The determination gives as basic data the structure of the fragmentary forepart of the veneer web and the length of this quality section, as well as the length of the full veneer section of the last part of the veneer web.

The structure of the fragmentary proportion of the forepart defines the quantity of usable pieces to be recovered from it by cutting, and a respective grade can be given to those parts. When also a respective grade is given to the full veneer pieces, the grade yield gained by peeling will be received as a result, based on this centring data. The peeling yield can be affected by changing the location of the peeling axis in the log determined by the centring device. At its simplest, this can be used for affecting the structure of the random forepart of the veneer web, and also its length. By means of these simulated determinations for changing the peeling axis, it is possible, taken into account the grades of the sections, to determine the peeling axis that provides the maximum grade yield from the log. It is possible to perform multiple iteration cycles of this kind for one and the same log, for instance about 100 successive simulation determinations, whereby the optimal peeling axis will be determined with an extreme accuracy. This data is communicated to the centring device, and the log is transferred to the lathe centred in accordance with this data.

The method in accordance with the invention can also be implemented more accomplished, whereby additional information about the log will be given to the simulation determination. This information includes, for instance, the portion of the sapwood and heartwood in the log. This information can be based on empirical information, or it can be received based on observation or determination of the log. The empirical information, primarily, takes into account the wood species. Information on the internal construction of the log can be received by measuring, above all on distribution of the sapwood and heartwood for instance at the ends of the log. The sapwood and heartwood differ from each other in general in respect to their colour, said difference being verifiable by suitable camera equipment and the data being transferable to the processing equipment implementing the simulation. Also radioscopy for instance with X-ray equipment is possible, said method giving an accurate picture of the construction of the log and revealing for instance the internal knags.

The sapwood gives with many wood species clearly better veneer quality than the heartwood, whereby this fact can be taken into account when defining the quality sectioning of the rotary-cut veneer web, and a respective grade can be given to this section. Also a reverse quality sectioning between the wood layers is possible, depending on the wood species. That gives one factor more for the optimization of the grade yield.

The quality yield of veneer from the log can be determined by means of a computerized simulation visualizing the rotary-cut veneer inside the log or by performing a virtual peeling into veneer web. The simulation result can also be visualized on the display, whereby especially the final result of the virtual peeling gives a visualized picture of the final result of the actual peeling to be performed.

The fragmentary forepart of the rotary-cut veneer web, as well in the determination of the veneer yield as in the actual peeling, can be split to half in the longitudinal direction of the web, preferably in the middle of the web, in order to cut web pieces of half-length. Also other splitting lines can be considered, depending on the use. Also multiple splitting lines can be made for determining the length of the web pieces selectively, at the appropriate point of the web.

The different sections of the web can also be peeled to different thicknesses, as well in the simulation determination as in the actual peeling. For instance the high-grade veneer to be peeled from the sapwood is often appropriate to be peeled thinner than the rest part of the web, whereby a bigger portion of area will be received from the log as high-grade veneer.

In the enclosed drawing a figure of one virtual peeling as a resulted sheet cutting has been shown. Reference numbers stand for: 1=joint veneer, 2=lower-grade (heartwood) veneer, 3=lower-grade/high-grade veneer, 4=high-grade veneer, 5=fragmentary veneer, split in the middle of the web, 6=round-up waste.

The invention claimed is:

1. A method for optimizing the value of yield in veneer peeling, said method comprising:

a) scanning the contour of a log to be peeled as measurement values;

b) determining a log specification for the log on said scanned contour measurement values;

c) inputting said scanned contour measurement values into a data processing device to define a virtual log;

d) selecting a simulation turning axis on said log specification;

e) carrying out a first data processing device simulated peeling using said turning axis and said scanned log measurement values for the data processing device to simulate a peeled veneer web;

f) defining at least two veneer quality grades to indicate respective sections on said simulated peeled veneer web;

g) determining an area of each section having a quality of one of said at least two veneer quality grades on said simulated peeled veneer web;

h) giving a value for each of the at least two quality grades;

i) defining a total yield value for said simulated peeled veneer web;

j) selecting an alternative simulation turning axis on said log specification;

k) carrying out a subsequent data processing device simulated peeling using said alternative simulation axis and said scanned log measurement values for the data processing device to simulate a subsequent peeled veneer web;

l) performing steps f) through i);

m) repeating steps j) through l);

n) selecting a turning axis for an actual veneer peeling giving the highest total yield value; and o) carrying out said actual veneer peeling from said actual log using said selected turning axis.

2. A method according to claim 1, wherein a simulation thickness of the veneer is included in the definition of the veneer quality grade.

3. A method according to claim 1, wherein information on a wood species of the log is entered into the data processing device in determining the log specification.

4. A method according to claim 1, wherein determining the log specification includes evaluating a structure of the log.

5. A method according to claim 4, wherein the structure is evaluated on an image of at least one log end.

6. A method according to claim 4, wherein the structure is evaluated based on radioscopy of the log.

7. A method according to claim 1, wherein determining an area of each section on said simulated veneer web having a quality of one of said at least two veneer quality grades includes splitting a leading end section of the veneer web along at least one line in a web direction.

* * * * *